W. G. FORDING.
CLUTCH.
APPLICATION FILED JULY 7, 1915.

1,235,561.

Patented Aug. 7, 1917.
2 SHEETS—SHEET 1.

Witnesses=
O. M. Kappler
Thos. H. Fay

Inventor
William G. Fording
By Fay, Oberlin & Fay
Attorneys

W. G. FORDING.
CLUTCH.
APPLICATION FILED JULY 7, 1915.

1,235,561.

Patented Aug. 7, 1917.
2 SHEETS—SHEET 2.

WITNESSES=
O. M. Kappler
Thos. H. Fay

INVENTOR
William G. Fording
BY Fay, Oberlin & Fay
ATTORNEYS

UNITED STATES PATENT OFFICE.

WILLIAM G. FORDING, OF CLEVELAND, OHIO, ASSIGNOR TO THE RELIANCE GAUGE COLUMN COMPANY, OF CLEVELAND, OHIO, A CORPORATION OF OHIO.

CLUTCH.

1,235,561.   Specification of Letters Patent.   Patented Aug. 7, 1917.

Application filed July 7, 1915. Serial No. 38,450.

*To all whom it may concern:*

Be it known that I, WILLIAM G. FORDING, a citizen of the United States, and a resident of Cleveland, county of Cuyahoga, and State of Ohio, have invented a new and useful Improvement in Clutches, of which the following is a specification, the principle of the invention being herein explained and the best mode in which I have contemplated applying that principle, so as to distinguish it from other inventions.

The present invention relates to an improvement in clutches and more particularly to an improvement in clutches of the type known as internal expanding clutches, in which a split, expansible band is maintained in a floating position between an outer member which is to be driven and a driving member upon which the band is loosely supported, and to which it is non-rotatably secured. The particular part of such clutch, which is the subject matter of the present interest, is the mechanism interposed between the ends of such expansible band, and it is to provide a simple and readily adjustable mechanism at this point that the present invention has been produced, although it will be understood that such mechanism may be otherwise incorporated in the clutch structure, without departing from the spirit of the invention. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
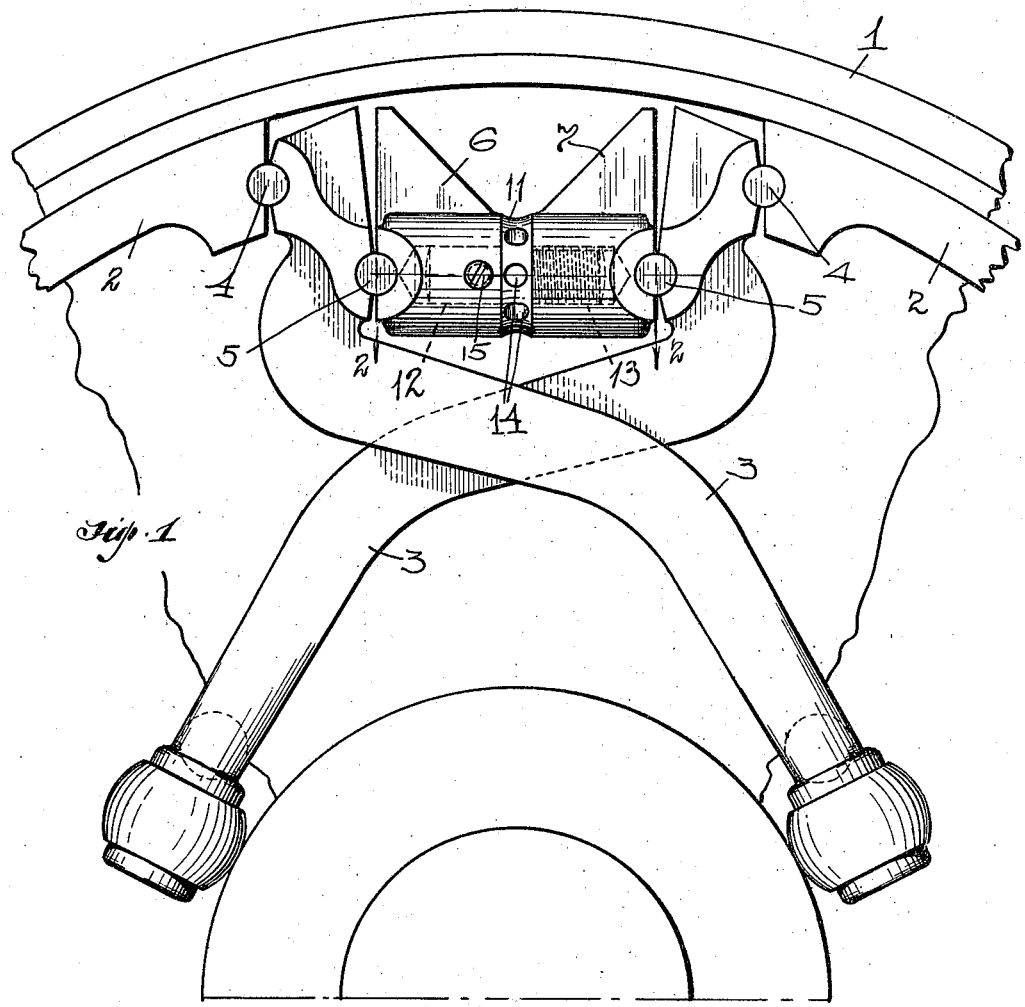
Figure 2:
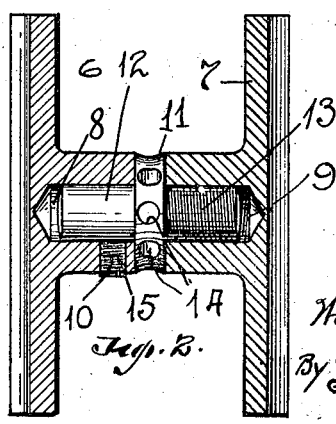
Figure 3:
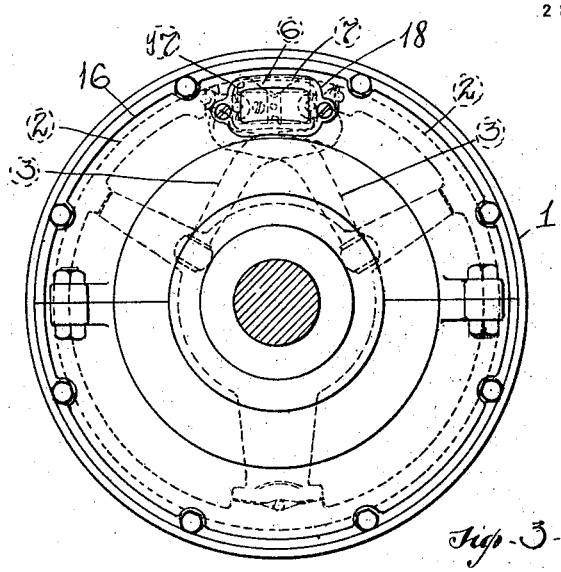
Figure 5:
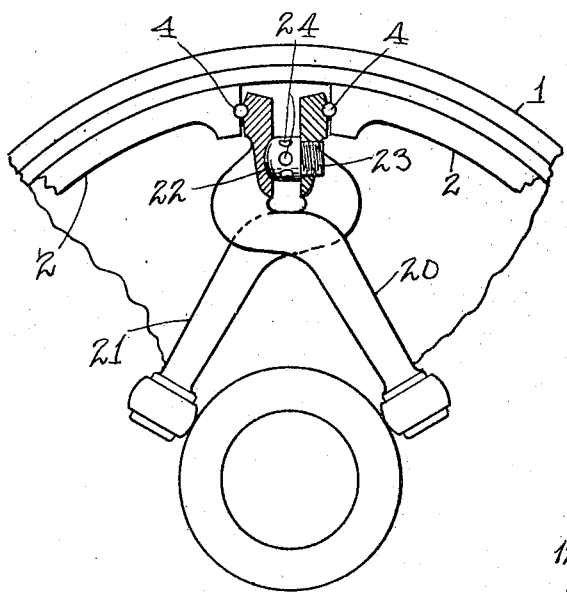
Figure 4:
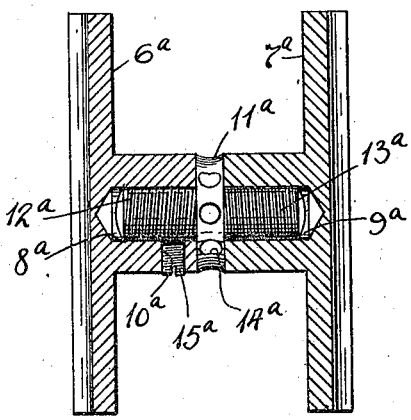

Figure 1 is a partial front elevation of a clutch of the type in hand in which my improvement is shown; Fig. 2 is a longitudinal section on the line 2—2, Fig. 1; Fig. 3 is a sectional view of the complete structure; Fig. 4 is a view similar to Fig. 2 but showing a modification in construction; and Fig. 5 is a view similar to Fig. 1, but showing still another modification.

In Figs. 1 and 3, the outer or driven member of the clutch is shown as a hollow cylindrical casing 1, which may or may not be a pulley used in the transmission of power. Such casing is adapted to be operatively connected with the driving member by means of the expansion of a split band 2, which is maintained normally disengaged from the member 1 and within the same by any suitable means, which need not be here described. The preferred mechanism for expanding the band 2 comprises crossed arms or fingers 3, which operate against the ends of the band 2, or otherwise engage the same to expand the band, through the medium of rollers or pins 4, having a pivotal relation with both the ends of the band and the ends of the fingers 3. These rollers or pins 4 may or may not be attached either to the member 2 or the members 3.

The crossed fingers 3, the inner ends of which are to be moved apart and at the same time radially outward by any suitable means in order to operate the clutch, are caused to pivot about other rollers or pins 5 received partly in suitable recesses formed in the adjacent faces of the arms and partly in similar recesses formed in the external faces of two adjacently disposed blocks 6 and 7. These blocks 6 and 7 are adjustably secured in their relation with each other by means which will now be described.

Referring first to Fig. 2, it will be seen that said blocks 6 and 7 are provided with alined openings 8 and 9 of which the opening 9 is preferably threaded while the opening 8 is smooth but connects with a threaded lateral opening 10. Interposed between the adjacent faces of the blocks 6 and 7 is a turn-buckle member comprising a disk 11 and two oppositely extending pins 12 and 13 attached thereto. The pin 13 is threaded and is thus adapted to adjustably engage in the aperture 9 in the block 7, while the pin 12 is formed of a size adapting it to fit snugly into the opening 8 in the block 6. It will be obvious that by rotating the disk 11, which may be done conveniently by means of any suitable tool inserted in one of the various holes 14 formed in such disk for this purpose, this disk may be spaced a greater or less distance from the face of the block 7. The turn buckle is then held in desired adjusted position by a set screw 15 inserted in the lateral opening 10, and engaging the pin 12.

The two blocks 6 and 7, thus adjustably secured together, it will be seen provide the fulcrum points for the two crossed fingers 3, respectively. Accordingly, by varying the distance between such blocks in the manner just described, the distance between such points is at the same varied. In this way, not only may the parts be initially so adjusted as to secure proper gripping action between the band 2 and the driven member 1, but as wear occurs, either on the contacting faces of such band and member, or in the pins forming the several pivotal connections, such wear may be readily taken up by simply loosening the set-screw 15, and suitably turning the member 11.

Since the casing 1, constituting the driven member will ordinarily be completely closed, as by a plate 16 (Fig. 3), so as to retain in said casing the oil or other lubricant, which requires to be used when the clutch is being operated, I provide an opening 17 in this plate and a gate 18 fitted thereto, such opening being located so that it may be brought opposite the blocks 6 and 7. Accordingly, by simply opening the gate in question access may be had to the member 11 and any necessary adjustment quickly made without taking the clutch apart, or draining the oil therefrom.

Instead of having just the one pin on the turn-buckle member threaded, as above described, both such pins may be threaded, as illustrated in Fig. 4, where the parts are designated as before but with the suffix "a" to distinguish them from those in Fig. 2.

Moreover, in smaller sizes of clutches of the type in hand, it may not be desirable to employ any interposed block at all to provide fulcrum points for the crossed fingers, In such case, in other words, the fingers have been heretofore directly pivotally connected together. In order, however, to provide for a corresponding adjustability of parts, in this case, I have designed the construction illustrated in Fig. 5, where the fingers 20, 21, engaging the split band 2 as before, are connected by a ball and socket joint provided by a concave recess 22 in one such finger and a convexly headed stud 23, threaded in the other finger. The head of this stud has a series of apertures 24 in its periphery, whereby it may be engaged by a suitable operating tool and rotated, just as the turn-buckle member in the previously described construction. Obviously, an adjustment of the action of the parts is obtained very similar to that of such other construction, and with the same convenience and advantageous results. The blocks 6 and 7 may be regarded as being simply incorporated in the structure of the respective fingers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a split expansible band, of an expanding device interposed between the ends of said band and comprising crossed arms having their outer ends bearing against the ends of said band, and an intermediate member bearing against the adjacent faces of said arms and serving as a fulcrum for pivotal movement of said arms, said intermediate member being adjustable to vary the initial position of said arms.

2. The combination with a split expansible band, of an expanding device interposed between the ends of said band and comprising crossed arms having their outer ends bearing against the ends of said band, and an intermediate member bearing against the adjacent faces of said arms and serving as a fulcrum for pivotal movement of said arms said intermediate member consisting of two blocks and adjusting means for spacing said blocks to vary the initial position of said arms.

3. The combination with a split expansible band of an expanding device interposed between the ends of said band and comprising crossed arms having their outer ends bearing against the ends of said band, and an intermediate member bearing against the adjacent faces of said arms and serving as a fulcrum for pivotal movement of said arms, said intermediate member consisting of two blocks and an expanding pin engaging said blocks, and having an adjustable threaded engagement with one of said blocks.

4. The combination with a split expansible band, of an expanding device interposed between the ends of said band and comprising crossed arms having their outer ends bearing against the ends of said band, and an intermediate member bearing against the adjacent faces of said arms and serving as a fulcrum for pivotal movement of said arms, said intermediate member consisting of two blocks having alined threaded apertures and a right and left hand screw adjustably secured in such two openings.

5. The combination with a split expansible band, of an expanding device interposed between the ends of said band and comprising crossed arms having their outer ends bearing against the ends of said band, and an intermediate member bearing against the adjacent faces of said arms and serving as a fulcrum for pivotal movement of said arms, and said intermediate member being adjustable to vary the initial position of said arms and means for locking said member in its various positions.

6. The combination with a split expansible band, of an expanding device interposed between the ends of said band and comprising crossed arms having their outer ends bearing against the ends of said band, and an intermediate member bearing against the adjacent faces of said arms and serving as a fulcrum for pivotal movement of said arms, said member having adjustable threaded engagement with one of said arms to vary the initial position of said arms.

Signed by me, this 7th day of June 1915.

WM. G. FORDING.

Attested by—
C. C. CLELAND,
ESTHER JOHNSEN.

Copies of this patent may be obtained for five cents each, by addressing the "Commissioner of Patents, Washington, D. C."